F. SARGENT.
PIPE COUPLING.
APPLICATION FILED DEC. 18, 1909.
977,226.
Patented Nov. 29, 1910.
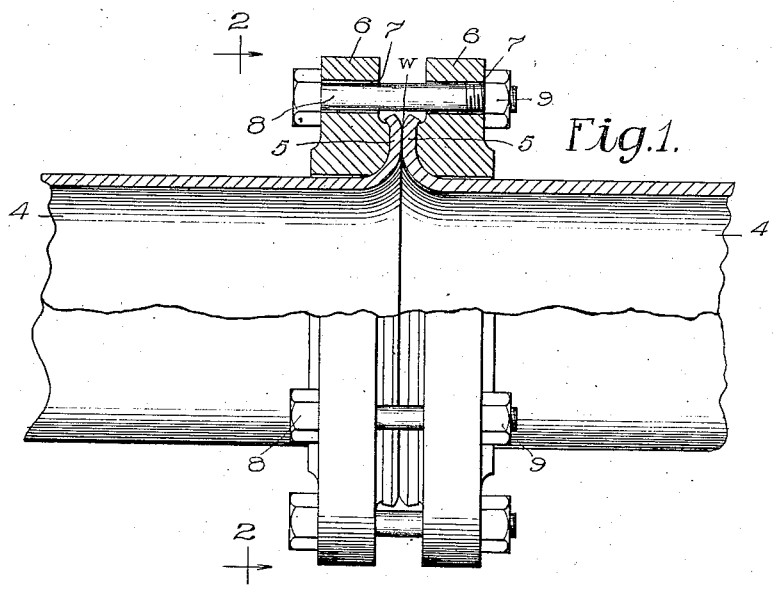
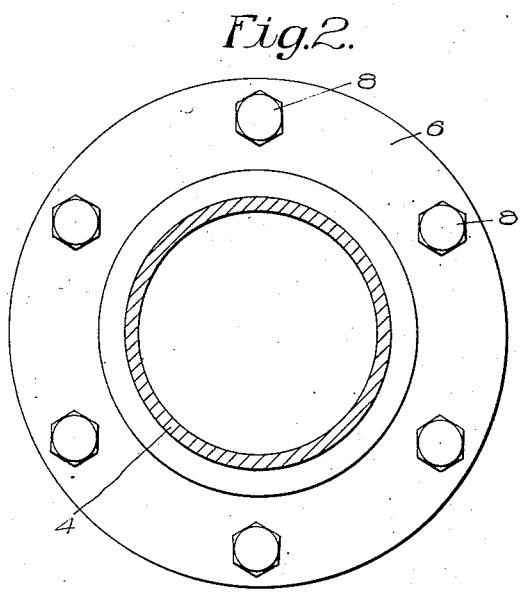
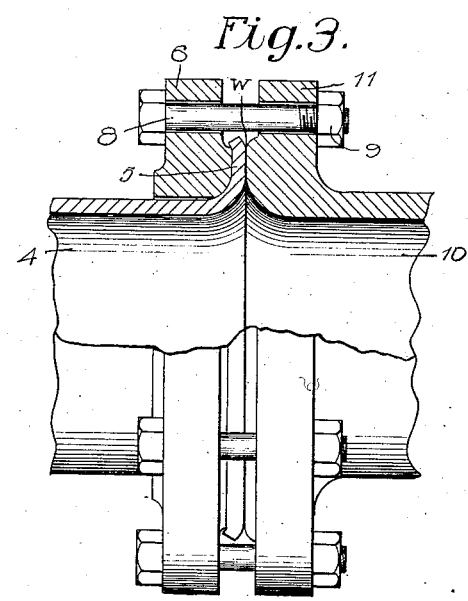
Witnesses
Inventor
Frederick Sargent
By Brown Williams
Attorneys

UNITED STATES PATENT OFFICE.

FREDERICK SARGENT, OF GLENCOE, ILLINOIS, ASSIGNOR OF ONE-HALF TO OLAF E. OLESON, OF CHICAGO, ILLINOIS.

PIPE-COUPLING.

977,226.  Specification of Letters Patent.  Patented Nov. 29, 1910.

Application filed December 18, 1909. Serial No. 533,95..

*To all whom it may concern:*

Be it known that I, FREDERICK SARGENT, a citizen of the United States, residing at Glencoe, in the county of Cook and State of Illinois, have invented certain new and useful Improvements in Pipe-Couplings, of which the following is a full, clear, concise, and exact description, reference being had to the accompanying drawings, forming a part of this specification.

My invention relates to pipe couplings, and its object is to provide an absolutely tight and durable joint. In accordance with my invention the joint is sealed by welding the abutting ends of pipes to be joined together and is held secure by means of an auxiliary arrangement in the way of a mechanical clamp. The difficulty heretofore has been that a welded joint was not sufficiently reliable, so far as securing rigid mechanical connection of the joined pipes was concerned, and could not be used at all where it was probable that the pipes would be subjected to more or less frequent strains. So far as the continuity of the pipes or the tightness of the joint was concerned, it has been quite generally conceded that a welded joint cannot be excelled, and the only bar to its more frequent employment is the insecurity of the mechanical connection, as above pointed out.

My invention proposes the employment of a mechanical clamp to securely hold the ends of the pipe together and, in addition, the welding of the pipe ends to secure an absolutely sealed joint. In a pipe coupling constructed in accordance with my invention the necessity of gaskets, washers or similar packing devices, is entirely eliminated, while all the advantageous features of such contrivances are retained. The replacement of parts, so frequent when gaskets are employed, never becomes necessary while, in taking down a pipe system, no difficulty in separating the pipes is encountered.

A pipe coupling made in accordance with my invention is illustrated in the accompanying drawings in which—

Figure 1 is a side elevational view, part of the structure being broken away to show the same in section; Fig. 2 is a cross-sectional view taken on the plane 2, 2 of Fig. 1, and Fig. 3 is a view similar to Fig. 1, showing a modified arrangement.

The abutting pipes are shown at 4, 4, and the ends thereof, as shown at 5, 5 are flanged outwardly to present a considerable engaging surface and, further, to provide means with which a mechanical clamp can coöperate. The mechanical clamp comprises, as illustrated, a pair of clamping rings 6, 6, which engage respectively on opposite sides of the joined flanges, as clearly shown in Fig. 1. The rings 6, 6 are provided with registering openings 7, 7 for the reception of bolts 8, 8 which are provided with clamping nuts 9, 9 so that the two rings can be drawn together to the desired extent.

In usual practice the pipes shown in Fig. 1 are made of soft steel and, when they are to be joined, are flanged at their abutting ends in any desirable manner. The clamping rings are then applied and the bolts tightened to securely bring the flanged ends together, and a hot flame, conveniently an oxy-acetylene flame, is passed around the joined ends to form a weld at $w$, being applied specifically to the edges so that the welding area will be a somewhat limited one. It is to be noted that the entire mechanical strain is taken up by the clamp, while the welding does no more than to form a hermetic seal.

In Fig. 3 one of the pipe members is shown as a casting 10 which has one of the clamping members 11 formed integrally thereon. The pipe 4 is of soft steel like the pipes shown in Fig. 1, and the clamping member 6 is applied precisely as described above. The bolt 9 passes through the clamping member 6 and directly through the member 11 on the casting 10, and tightening of the bolts draws the flanged end 5 of the pipe 4 against the face of the casting 10, as clearly illustrated in the drawing. The flame is then passed around the abutting ends to form a weld at $w$, as described above. It is contemplated that this modified form will be employed where one of the members is an elbow, coupling valve or other similar device.

In the matter of welding the pipe ends together I also contemplate the use of an electric arc flame, this method being conveniently carried out by attaching one terminal of a high tension circuit to the pipe proper and drawing the arc from the edge $w$ with the other terminal of the circuit. This will secure the weld efficiently and is a particularly advantageous method, since the flame can be confined to just those parts which it is desired to weld.

I claim as new and desire to secure by Letters Patent:

1. A pipe coupling comprising the abutting ends of pipes, said ends being welded to form a sealed joint, and means for mechanically clamping said ends together.

2. A pipe coupling comprising the integral flanged ends of abutting pipes, said ends being welded together, and means for mechanically clamping said ends together.

3. A pipe coupling comprising the integral flanged ends of abutting pipes, said ends being welded together, a clamping ring engaging each of said flanged ends, and bolts for securing said flanged ends together.

4. A pipe coupling comprising the abutting ends of pipes, said ends being welded to form a sealed joint, and means for permanently mechanically clamping said ends together.

5. A pipe coupling comprising the flanged ends of abutting pipes, the edges of said flanges being turned back to leave an annular groove, and said ends being welded together, and means for mechanically clamping said ends together.

In witness whereof, I hereunto subscribe my name this 15th day of December, A. D., 1909.

FREDERICK SARGENT.

Witnesses:
ARTHUR H. BOETTCHER,
LEONARD W. NOVANDER.